Figure 1:
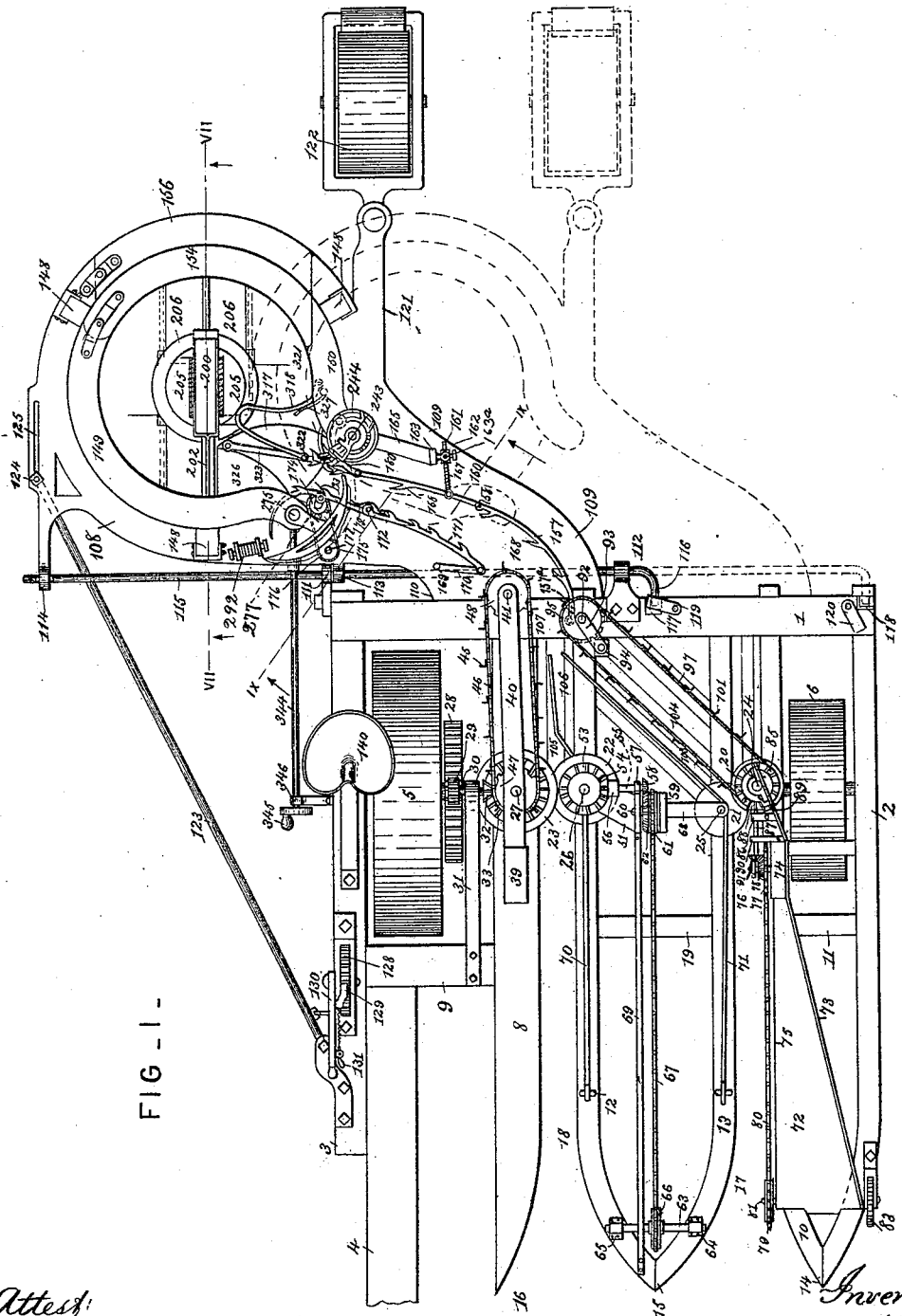

(No Model.) 7 Sheets—Sheet 1.

E. E. WITTER.
CORN HARVESTER.

No. 458,088. Patented Aug. 18, 1891.

Attest:
Jas. K. McCathran
Geo. L. Wheelock

Inventor
Ezra E. Witter
By Knight Bros.
attys (No Model.) 7 Sheets—Sheet 2.
E. E. WITTER.
CORN HARVESTER.
No. 458,088. Patented Aug. 18, 1891.
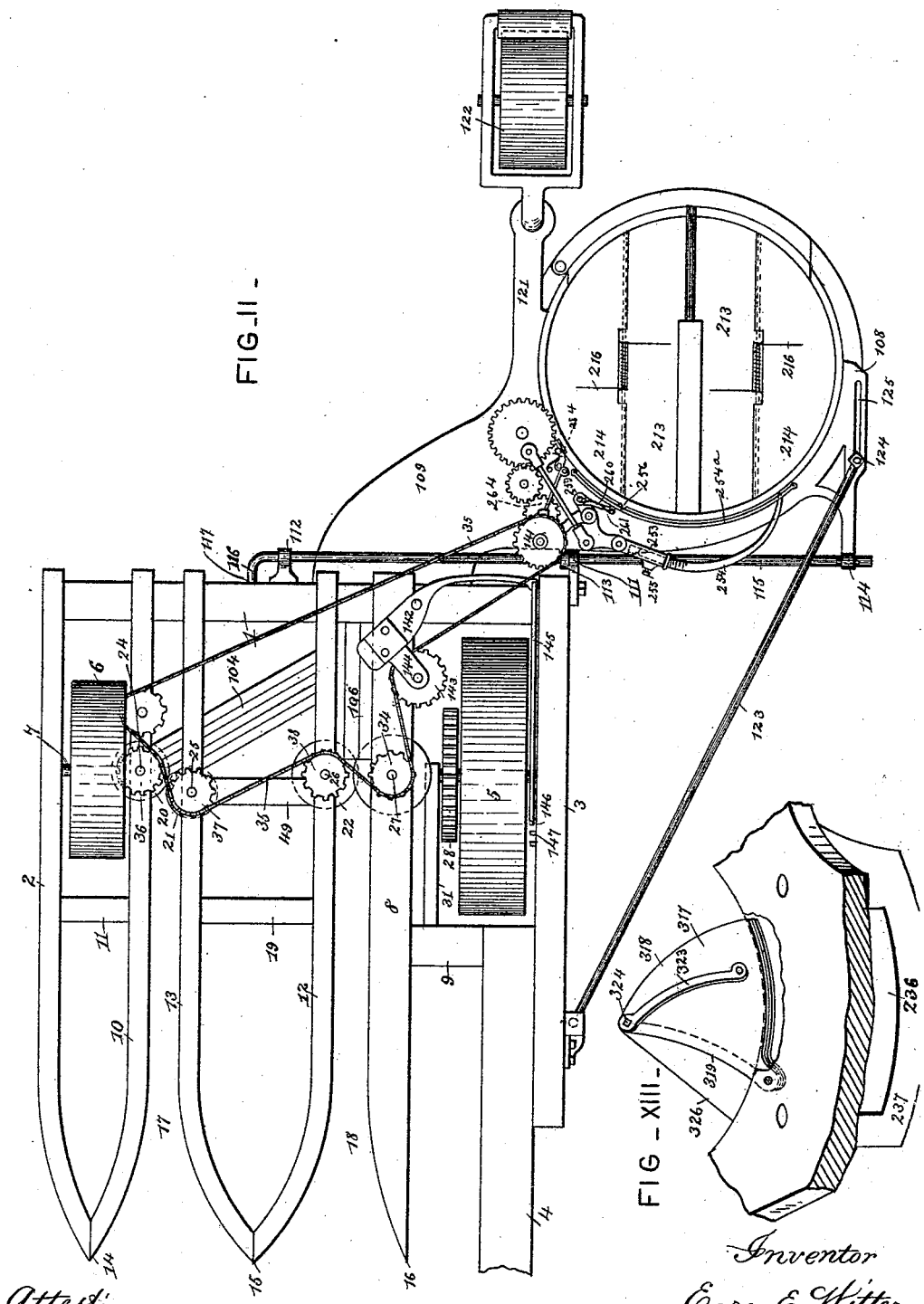

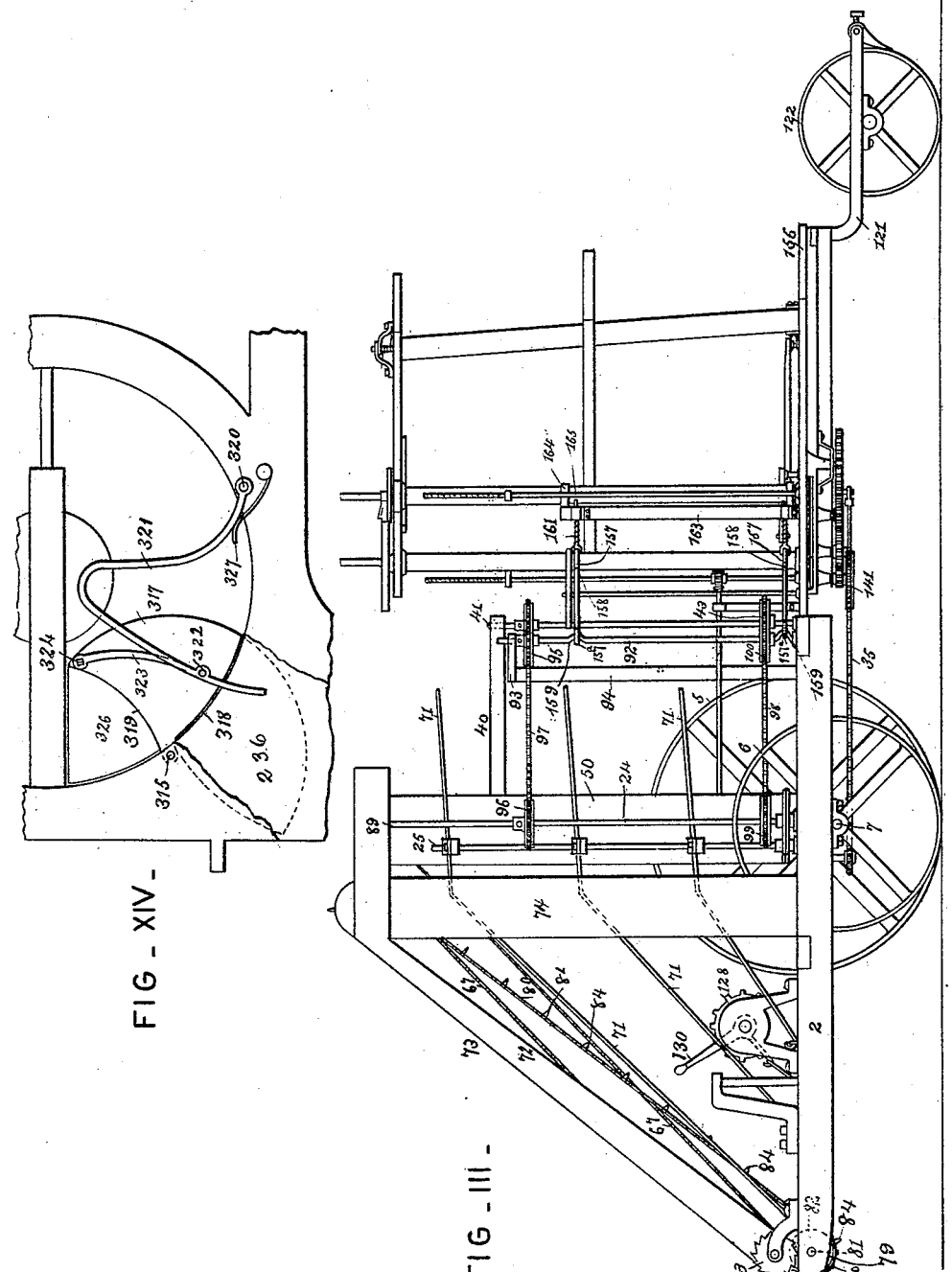

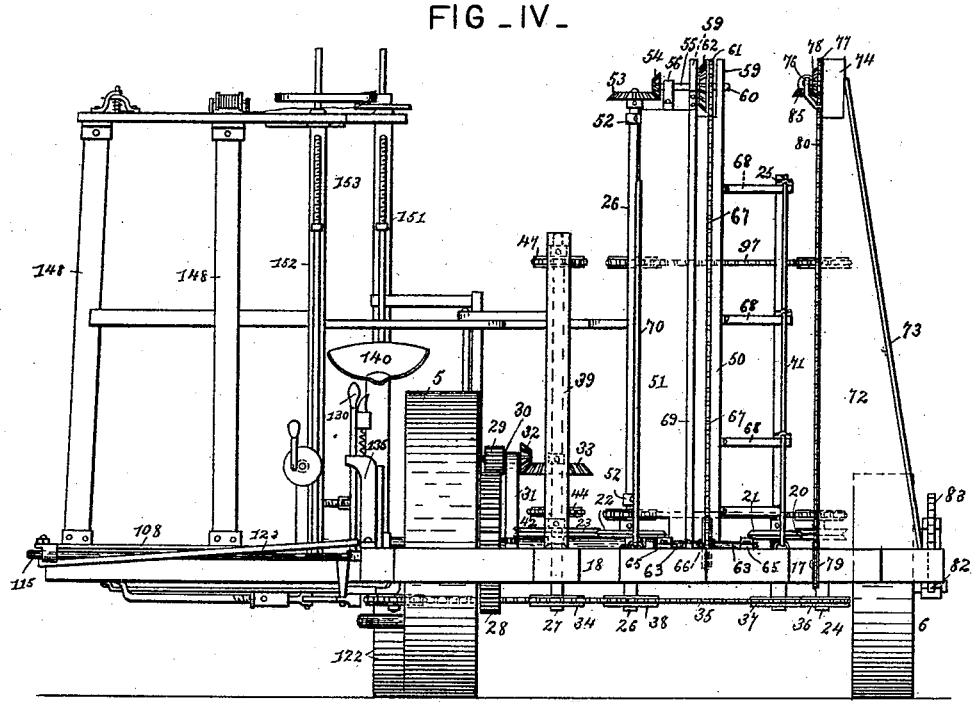

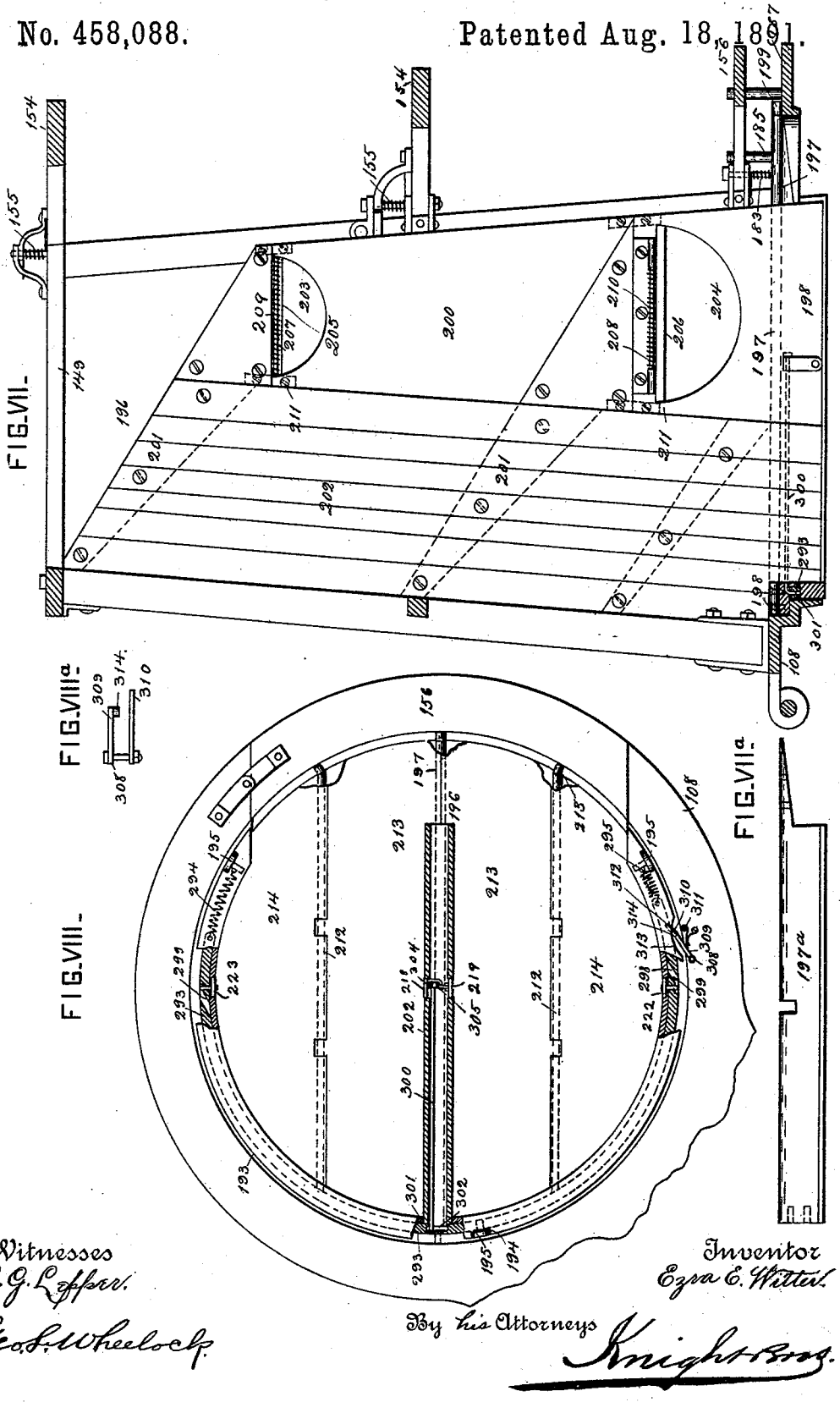

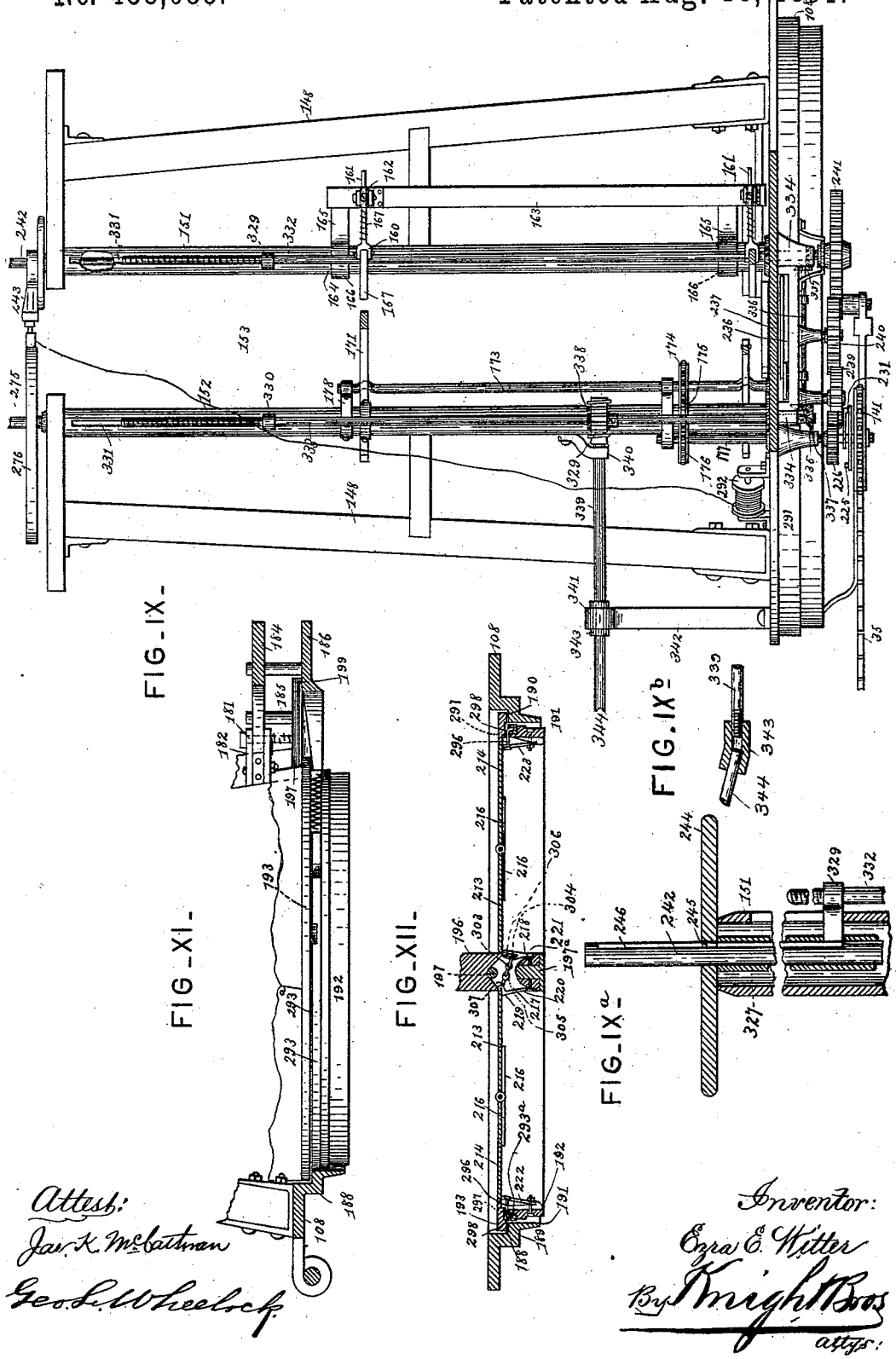

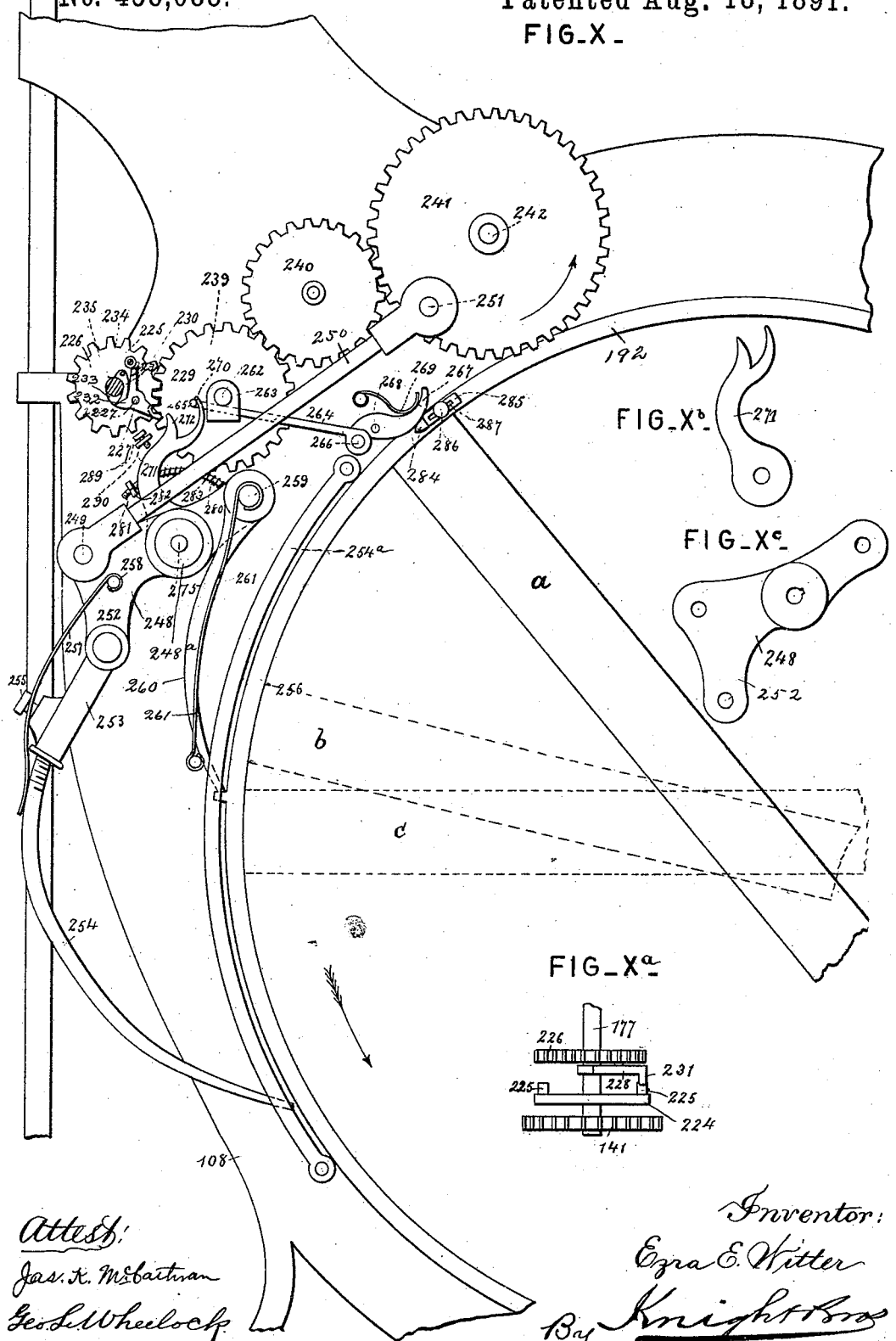

UNITED STATES PATENT OFFICE.

EZRA EDGAR WITTER, OF MILFORD CENTRE, OHIO.

CORN-HARVESTER.

SPECIFICATION forming part of Letters Patent No. 458,088, dated August 18, 1891.

Application filed March 11, 1889. Serial No. 302,786. (No model.)

*To all whom it may concern:*

Be it known that I, EZRA EDGAR WITTER, a citizen of the United States, residing at Milford Centre, Union county, Ohio, have invented certain new and useful Improvements in Corn-Harvesters, of which the following is a specification.

My invention relates to that class of corn-harvesters where the stalks of corn are cut as the machine travels forward, and such stalks are carried by suitable mechanism to a gathering device, wherein the stalks are bound and afterward deposited on the ground.

The object of my invention is to so construct a corn-harvesting machine as that two rows of cornstalks (or only one) may be cut, while at the same time cutting and elevating any stalks which may be lying down, especially those which lie toward the machine from the third or second row, according as the machine is capable of cutting two rows or only one row.

It further has for its object the carrying of both the upright and down corn in an approximately upright or vertical position to the gathering device.

It further has for its object the automatic binding and discharge of the shock so gathered.

To these ends my invention consists of certain features of novelty which will be hereinafter fully described, and then particularly pointed out in the claims.

In order that my invention may be clearly understood, I will now proceed to describe the same, reference being had to the accompanying drawings, in which—

Figure I is a plan view of my entire machine, the draft attachments, however, excepted. Fig. II is an under side view. Fig. III is a side elevation looking toward the side where the inclined chute and elevating-belt are situated. Fig. IV is a front elevation. Fig. V is a detail view showing the operating mechanism for depressing the front end of the machine. Fig. VI is a detail view of the rear portion of the preferred form of depressing or tilting device. Fig. VII is a vertical section of the rear part of the machine or shock-gathering device on the line VII VII, Fig. I. Fig. VII$^a$ is a side view of the brace at the extreme bottom of the vertical partition of the shock-gathering frame. Fig. VIII is a horizontal section on the line VIII VIII, Fig. VII. Fig. VIII$^a$ is a detail view of the dogs which operate the catches that support the leaves of the revolving frame. Fig. IX is a section looking toward the rear end of the machine on the line IX IX, Fig. I. Fig. IX$^a$ is a view showing parts of the devices for elevating either the knotter or needle. Fig. IX$^b$ is a detail view of coupling 343. Fig. X is an under side view of a portion of the shock-gathering device on an enlarged scale, showing the operating mechanism of that portion of my machine. Fig. X$^a$ shows the loose cog-wheel and L-shaped trigger for bringing into action this mechanism. Fig. X$^b$ is a detail view of the trip which intermittently engages the L-shaped lever, also showing its rock-arm. Fig. X$^c$ is a detail view of the rocking lever at the lower end of the needle-shaft. Fig. XI is a section of the lower part of the shock-gathering device on the same line as in Fig. VII, the lower part of the revolving frame being shown in elevation. Fig. XII is a vertical section on the line XII XII, Fig. VIII. Figs. XIII and XIV are detail views of the swinging shelves and contiguous parts.

Referring to the drawings, 1 represents the back beam or timber of the front portion of the machine; 2 3, the side beams, and 4 the draft-beam.

5 is the main wheel at one side of the machine, which drives all the machinery, and 6 the smaller wheel, generally termed the "grain-wheel," at the other side of the machine.

7 is the axle, which is bent down at the small wheel so as to fit its center. The side beam 3 is on one side of the main wheel 5, and the forwardly-projecting pointed beam 8 is on the other side contiguous thereto, and it is secured to the rear beam 1. Beams 3 and 8 are strengthened and braced by cross-piece 9, to which the draft pole or beam 4 is fastened, whereto the draft attachments for the horses are connected. The side beam 2 on the outer side of the small wheel 6 is curved inwardly at its front end, and is joined at this end to another beam 10, curved toward it at the front end to form a point, this beam extending from the back beam 1 on the opposite side of the small wheel. These two beams 2 and 10 are connected by a cross-piece 11.

Between the beams 8 and 10 and extending forward from the back beam 1 are two beams 12 and 13, substantially the same as beams 2 and 10, which are curved toward each other near their front ends and are there joined in a point.

14, 15, and 16 are the points of the beams, the curved sides of which serve as guides to cause the stalks to enter the passages 17 and 18 between beams 10 and 13 and 8 and 12, respectively, as the machine is drawn forward.

19 is a cross-piece connecting the beams 12 and 13.

As stated, the stalks enter the passages 17 and 18, the ones lying down on the ground being lifted by the points 14, 15, and 16, and as the machine is carried forward the stalks coming in contact with the rotary disk-cutters 20 21 and 22 23 are severed. Cutters 20 and 21 are arranged across the passage 17 near its rear end, and the cutters 22 and 23 are arranged across the passage 18, also near its rear end. The cutter 20 is mounted on a vertical shaft 24, having bearing in the beam 10, and the cutter 21 is mounted on a vertical shaft 25, having bearing in the beam 13. The cutters 22 and 23 are likewise mounted on vertical shafts 26 and 27, having bearing, respectively, in beams 12 and 8.

The hub of the main wheel 5 has fixed thereon a toothed wheel 28, which meshes with a pinion 29 on one end of a short shaft 30, which is journaled in bearings in a support 31, fixed to the cross-piece 9. This short shaft 30 is provided at its other end with a bevel gear-wheel 32, which meshes with a horizontal bevel gear-wheel 33 on the vertical shaft 27. This gearing is the means whereby the various parts of the machine are driven. The lower end of the shaft 27 carries a sprocket-wheel 34, and with this engages the sprocket-chain 35, which also engages sprocket-wheels 36, 37, and 38 at the lower ends of vertical shafts 24, 25, and 26, respectively, said sprocket wheels and chain being underneath the beams constituting the framing of the machine. A vertical post 39 is fastened to the beam 8, and extending horizontally from its upper end toward the rear end of the machine is an arm 40, ending just above the rear beam 1, both of which serve to support shaft 41 in vertical position. This arm 40 supports the upper end of shaft 27, journaled in it.

Fixed near the lower ends of the shafts 27 and 41 are sprocket-wheels 42 and 43, respectively, around which passes a sprocket-chain 44, provided with numerous projections 45. A similar sprocket-chain 46 passes around sprocket-wheels 47 and 48 at the upper ends of said shafts. These conveyer-chains 44 and 46 pass the stalks toward the rear end of the machine after they are severed by the cutters 22 and 23.

49 is a cross-piece connecting the beams 12 and 13, on which is fixed a vertical post 50, which has fixed to it a board 51, having brackets 52, in which the vertical shaft 26 is journaled. This shaft 26 carries a horizontal bevel gear-wheel 53 at its upper end, which engages a vertical bevel gear-wheel 54, fixed on one end of a short shaft 55, bearing in a bracket 56 on the board 51. The other end of short shaft 55 has bearing in a bracket 57, fixed to post 50, and carries a bevel gear-wheel 58. The upper end of post 50 is bifurcated, and in its forks 59 is journaled a short horizontal shaft 60, on which is fixed a compound sprocket and bevel wheel having sprocket-teeth 61 and bevel-gear 62, with which latter the bevel gear-wheel 58 meshes.

Carried by a shaft 63, mounted in brackets 64 65 near the point 15 of beams 12 13, is a sprocket-wheel 66, around which and the sprocket-wheel 61 passes an upwardly-inclined sprocket-chain 67, which aids to elevate the down stalks gathered by point 15.

68 are brackets extending sidewise from the post 50, in which is journaled the vertical shaft 25.

69 is a brace-rod extending from near the point 15 to the top of post 50 and serves as a guide. 70 and 71 are other guide-rods, which are secured to the beams 12 and 13, respectively, and are inclined upwardly, and then extend rearwardly behind the shafts 25 26 and nearly meet a short distance from the rear beam 1.

72 is a rearwardly-inclined chute having a vertical flange 73. The bottom of this chute is fixed near the front ends of the beams 2 and 10 or near point 14, and its upper end is secured to the vertical post 74. The chute has a straight inner edge 75, and the flange 73 is inclined from the bottom thereof to near the straight edge at its upper end, and thus the chute forms a guideway gradually decreasing in width from bottom to top.

At the upper end of post 74 is a bracket 76, in which and said post is mounted a sprocket-wheel 77, having a bevel gear-face 78. Passing around this sprocket-wheel 77 and around another sprocket-wheel 79, situated at the front ends of the beams 2 and 10, is an upwardly-inclined sprocket-chain 80, which runs parallel with the straight inner edge 75 of the chute 72. Sprocket-wheel 79 is fixed on the inner end of a shaft 81, which extends across the front ends of beams 2 and 10, in which it is journaled. The outer end of this shaft carries a cutter-disk 82. This cutter-disk operates in conjunction with a circular-saw cutter 83 above it to sever the stalks which may be lying toward the machine from the row outside the path of the machine, and which stalks are gathered up by the point 14. These stalks, being severed by the cutters 82 83, are caught by projections 84 on the sprocket-chain 80 and are carried into nearly vertical position thereby with the assistance of the chute or inclined plane 72 and its flange 73, and are then carried over the edge 75 of the chute into the passage 17, where they are carried to the rear part of the machine by the assistance of the stalks entering said passage, which latter when they come in contact with the cutters 22 23 are severed and carried back with the stalks severed by the side cutters. Shaft 24 at its upper end carries a bevel gear-wheel 85, which meshes with a bevel gear-wheel 88 on one end of a short horizontal shaft 87, journaled at one end in a bracket 86, fastened to the extension 89 of the upper end of the chute, on which extension the upper end of shaft 24 is journaled. The other end of shaft 87 is journaled in a bracket 90 and carries a bevel gear-wheel 91, which meshes with the bevel gear-face 78 of sprocket-wheel 77.

Journaled in the back beam 1 at one side of the end of passage 18 is a vertical shaft 92, which is journaled at its upper end in a bracket 93, secured to the vertical post 94. Two sprocket-wheels 95 and 96 are mounted near the upper ends of shafts 24 and 92, respectively, and around these a sprocket-chain 97 passes. A similar sprocket-chain 98 passes around sprocket-wheels 99 and 100 near the lower ends of shafts 24 and 92, respectively. Each of these sprocket-chains 97 and 98 is provided with projections 101. The guide-rods 71, secured to the beams 13, as before observed, extend to the rear of the shaft 25 and toward the guide-rods 70. Now these rods 71 form, together with the sprocket-chains 97 and 98, substantially parallel therewith, a passage 103 above the floor 104, diverging from the rear end of passage 17 toward the rear end of passage 105, leading from the rear end of passage 18, which passage 105 is above the floor 106. It will therefore be seen that the stalks entering the passages 17 and 18 and being severed by the cutters will be conveyed along the passages 103 and 105 by the projections on the horizontally-moving sprocket-chains to a common outlet 107, situated between the rear ends of said sprocket-chains and at the rear ends of the guide-rods.

The frame 108 of the shock-gathering device has an extended floor 109, which may be cast in one piece therewith, the edge 110 of which comes flush with the rear end of the main or front portion of the machine. The back beam 1 has rearwardly-projecting collars 111 and 112, the collar 111 being secured to the rear end of beam 3 and the collar 112 being secured about midway of the beam 1. Collars 113 and 114 are formed with the frame 108, collar 113 being formed about midway of the front edge 110 of the frame and collar 114 at the front edge opposite the extension. Through these collars 111 112 and 113 114 is passed a long hinge-rod 115, to which the collars 113 and 114 of the shock-gathering frame are rigidly secured, thus forming a hinge connection between the shock-gathering device and the main or front portion of the machine. The hinge-rod has a hook or arm 116, which may engage recesses 117 or 118 in the beam 1, according as to whether the harvester is in operative position, in which case the shock-gathering frame is moved to one side, so that the extended floor thereof will be to the rear of the common outlet 107 when the arm or hook 116 engages the recess 117, or whether the shock-gathering frame is moved behind the front portion of the machine, so that the latter may pass through gateways when the arm engages the recess 118. Buttons 119 and 120 may be provided for retaining the arm or hook in the recesses.

121 is a rearwardly-projecting arm from the frame 108 of the shocking and binding device which carries the caster-wheel 122 for supporting the latter.

For depressing the front end of the harvester so that the gathering-points will effectually lift the stalks which may be lying on the ground I provide the following mechanism, reference being had to Figs. V and VI for the preferred form: 123 is a rod or bar extending toward the front of the machine and having at its rear end a bolt 124, which may move the length of slot 125 in the cast-frame 108, said rod passing above the hinged rod 115. To prevent the upward movement of the rod 123, a bridge-piece or guide 126 is fixed above the line of its permitted lateral movement on the under side of which it bears. Secured to the beam 3 near its front end is a bracket 127, having a quadrant-rack 128, with the teeth of which the spring-operated pawl 129 of the operating-lever 130, pivoted concentrically to the teeth of the rack 128, engages. This spring-pawl is released from engagement with the teeth by a trigger 131. The operating-lever has an arm 132, provided with a hook 133, over which engages one end of a link 134, pivotally secured near the front end of the rod 123. 135 is an upwardly-projecting arm secured to the beam 3 in front of bracket 127, and it has an overhanging end 136, situated over the front end of rod 123. The upper end of a guide-bar 137 is secured to the overhanging end 136 of arm 135, and passes through an opening 138 in front of the link 134, and is rigidly secured to the beam 3 by means of a metallic strap or other fastening 139. The guide-bar 137 is slightly curved, being on the arc of a circle of which the hinge-rod 115 constitutes the center. It will be seen that the operator, who occupies seat 140 behind the lever, on pulling back on the same will depress the front end of the machine, the rod or bar 123 being held substantially rigid with the frame 108 by contact with the under side of the bridge-piece 126, for as the rod 123 cannot move upward relative to said frame the front end of the machine must move downward. In Figs. I and II the rod or bar 123 is shown as passing underneath the hinge-rod 115 and the slot, and the bolt 124 projects up through the slot, the effect being the same in both instances. The sprocket-wheel 141 (shown in Fig. II) is the main driving-wheel of the mechanism for binding the shock and discharging the shock from the gathering-frame. Around this sprocket-wheel the sprocket-chain 35 also passes. In the same figure is shown a device for tightening the chain 35, which consists of a lever 142, pivoted to the beam 1, one end of the lever carrying a sprocket-wheel 143, mounted in boxes 144, which wheel engages the said chain. The other end of the lever is connected with a rod 145, provided with a hook 146, which may engage any one of a series of pins 147 on the side beam 2, and according as the hook is engaged over one or the other of the pins the chain is made more or less taut.

I will now describe the construction and operation of my shock-gathering device constituting the rear portion of my harvester.

Referring to Fig. VIII, it will be seen that the frame 108 forms nearly a complete circle, it being open at its rear end. Standards 148 (see Figs. I and IX) are secured to the upper side of said frame, there being, preferably, three of them, two of them being placed one on each side of the rear opening and the other about midway of the same at the front of the frame. Fixed on top of these standards 148 are curved pieces concentric with the circular frame 108, one piece 149 being not quite equal to a semicircle and the other piece 150 being much shorter—less than one-half. A space is left between the rear ends of these pieces 149 and 150, which is about equal to the opening in the lower circular frame 108. The front ends of these curved pieces are turned outwardly, a space being left between them, forming an entrance for the stalks. Secured at their lower ends to the frame 108 and at their upper ends to the front ends of the curved pieces 149 and 150 are two vertical hollow columns 151 152 on each side of the entrance-opening 153 for the stalks as they are pushed into the shock-gathering frame, of which these parts constitute the framing. Hinged to the rear end of the curved top piece 149 and to the post below is a curved door or gate 154, which is held normally closed by means of the springs 155. Below this gate and hinged to the same post is a curved piece or gate 156, which, together with the frame 108, furnishes a circular track. This gate 156 will, however, be hereinafter more particularly referred to.

157 is a curved packer-arm having a break-joint 158 about midway of its length, and its rear has a curved or bent end and is arranged contiguous to the column 151 on the right of the entrance 153. The front end of the packer-arm is loosely and removably connected with the cranked portion 159 of the vertical shaft 92 of the main frame. There are two of these packers 157, one removably connected near the upper and the other near the lower end of cranked shaft 92 by segmental boxing 157ª. Each of these two packer-arms (there may, however, be any number of them) is pivotally connected at 160 to the rear of their joints 158 with movable rods 161, fitted so as to slide in collars or sleeves 162, which are swiveled to projections 163ª, extending from an upright 163 by means of brackets 165 and sleeves 166, secured upon the hollow column 151 at 164. Surrounding the rods 161 are spiral springs 167, fitted between the sleeves 162 and the pivotal connection 160. These packers are provided with projections 168, which extend toward their rear ends.

169 is a vertical oscillating shaft having cranks 170. To the outer ends of these cranks are pivotally connected near their front ends the packer-arms 171, (of which there are two or more,) having break-joints 172. The front ends are extended to near the vertical shaft 41, so that at whatever position these packers may be in there will be no means of escape for the stalks between them and the said shaft. The rear ends of these packers 171 are curved outwardly. Near their rear ends these packers are loosely connected with the cranked shaft 173, which has near its lower end a sprocket-wheel 174. Around this passes a sprocket-chain 175, which also passes around another sprocket-wheel 176, fixed on the short vertical shaft 177, which passes through the extended floor 109 of the frame 108 and carries on its lower end the main driving sprocket-wheel 141 of the shock-gathering device. The cranked shaft 173 is journaled in a bracket 178 at its upper end, said bracket being fixed to the hollow column on the left of the entrance to the shock-gathering frame. The packers 171 have projections similar to those on the packers 157.

179 are flat springs connected to the packer-arms 171 to the front of their front joint and extend rearward and bear upon the ends of the same at the rear of the joint. The packer-arms 157 are connected at their rear ends with links 180. The packers 157 and 171 form between them a passage for the stalks, and as they are caused to move back and forth by means of the crank-shafts 92 and 173, respectively, they constantly push the stalks into the shock-gathering frame, where they are packed in by the rear ends of the packers. The packers 157 are caused to spring suddenly or jump into the shocking-frame by reason of the loose rod and the spiral spring surrounding it.

The lower gate 156 at the rear of the shock-gathering frame is hinged by means of a bolt 181 to journal-brackets 182 on one of the posts or standards. Around this is coiled a spring 183, one end being secured to the post and the other to the gate for keeping the latter normally closed. This gate consists of an upper curved piece 184, connected by means of bolts or posts 185 to a lower curved piece 186, having a track 187.

The inner edge of the circular cast frame 108 has formed therewith a downwardly-projecting flange 188, it being offset at 189 to form a circular track 190, and is continued down and ends at 191. Adapted to revolve within this circular frame 108 and on the track 190 is circular frame or casting 192, which is broken away for a portion of its circumference, the open portion of the same matching at intervals with the opening in the rear of the main circular frame 108. At its top it is provided with an outwardly-projecting flange 193, having recesses 194, with anti-friction rollers 195 journaled therein.

The space within the shock-gathering frame is divided vertically by means of a partition 196, which is situated on a line drawn midway between the ends of the revolving circular frame or casting 192 to a diametrically-opposite point, and is supported on the said casting 192 by means of a bar 197, projecting from the casting at 198, to which it is connected in any suitable manner. This bar is longer than the width of said partition, and carries at its outer end an anti-friction roller 199. When this casting 192 revolves, it not only revolves on the track 190, but also on the track 187 of the lower gate when the latter is closed.

The vertical partition consists of a board 200, which is wider at bottom than at top, its bottom being about one-half the width of the opening in the top of the shock-gathering frame; but its dimensions are not very essential. The partition is supported, as well as by bar 197, by the brace or beam 197ª, that extends from the lower main side of casting 192 under the board 200. Secured to one side of the board 200 (see Fig. VII) are brackets of metal or other material 201, on each side of which are screwed or riveted strips of metal or wood 202. In the board 200 are formed semicircular openings 203 and 204 at the top and bottom, respectively, the former being smaller than the latter.

Fitting in the openings are half-disks 205 and 206, (see Fig. I,) the upper ones of which 205 are hinged by means of bolts 207 to the board 200, so as to swing down, and the lower ones are hinged thereto by means of bolts 208, so as to swing down. These half-disks are normally swung out at right angles to the board 200 by means of springs 209 and 210, which are coiled around the bolts 207 and 208, respectively, one end of each bearing against the board 200 and the other end of each against the half-disks. These half-disks should be properly termed "formers," for the reason that the stalks form around them into a shock as the partition revolves with its circular casting. These formers open the shock in the center, and when it is dropped permit it to brace or spread outward at its lower end and thus give it support. Secured vertically to the board are strips or braces 211 for strengthening it at the ends of its semicircular openings, these points being weak otherwise.

Projecting also from the inner side of the revolving circular casting 192 and parallel with the bar 197 are hinge-bars 212, one on each side of the bar 197 and midway of the radius drawn at right angles to the latter. On these hinge-bars are hinged, contiguous to the vertical partition, leaves 213, similar in shape, and contiguous to the sides of the revolving casting are hinged on said bars leaves 214 of the same shape. These hinge-rods 212 carry at their outer ends anti-friction rollers 215. These leaves open downwardly, and are brought up to their normal horizontal position by means of spiral springs 216, wound around the hinge-rods 212, and their free ends engage the under sides of the leaves. These leaves are supported while the stalks are being deposited onto them by suitable catches. The inner leaves 213 are supported by means of spring-catches 217 and 218, respectively, the former being secured by a rivet or screw below the leaf it supports and having a shoulder 219, on which the leaf is supported, and the latter is secured in the same manner beneath the other leaf 213, on the top of which its leaf is supported. The normal position of both of these spring-catches is out of their recesses 220 and 221. The outer leaves 214 are supported by means of spring-catches 222 and 223, respectively, Figs. VIII and XII, arranged below the outer edges of said leaves on the inner side of the revolving casting 192. The means for releasing these catches at the proper time will be described hereinafter.

The revolving frame, consisting of the casting 192 and vertical partition 196, is intermittently moved by the following mechanism: As the machine moves forward and the sprocket-chain 35 consequently put in motion, the sprocket-wheel 141 will be put into motion by the chain 35. On the same shaft 177 that wheel 141 is mounted upon an elongated casting 224 is fixed, which carries at its outer ends anti-friction rollers 225, mounted on top thereof, Fig. Xª. Loosely fitted on this shaft 177 is a cog-wheel 226, which has pivoted at 227, on the lower side, an L-shaped trigger 228, one arm being numbered 229 and the other arm 230, Fig. X. At the end of the arm 230 is a downward projection 231. The trigger has a rearwardly-projecting heel 232 to limit its outward movement by coming in contact with a lug 233 on the shaft. A spring 234, fixed at 235 to the cog-wheel 226, bears on the end of the arm 230 of the trigger to keep the latter in its normal outward position. It will be seen that with these devices the cog-wheel 226 will be caused to revolve with the shaft 177, unless it is tripped and its projection 231 disengaged from the anti-friction roller 225, and to this end I provide a device presently to be described.

The frame 108 of the shock-gathering device has formed therewith a bracket 237, having upwardly-extending portions 238, between which is an opening or slot 236. On the under side of this bracket 237, in suitable journals, are mounted the cog-wheels 239 and 240, the wheel 239 meshing with wheel 226 and being intermittently revolved by it, and the wheel 240 meshing with cog-wheel 239 and being likewise intermittently revolved by it. Cog-wheel 240 meshes with a large toothed wheel 241, which is keyed to rotating shaft 242, which passes through the hollow column 151 and carries at its upper end the knotter 243 of the binding mechanism. The operating-wheel 244 of the knotter has a feather 245, which is adapted to slide in a groove 246 in the side of the shaft 242.

The knotting mechanism here shown is of the Appleby type, the device illustrated being that of W. Butterfield, No. 365,044, patented June 21, 1887. Any form of knotting mechanism, however, in which a feather-and-groove connection can be made with the operating-shaft may be employed.

Keyed on the needle-shaft 275 is a rocking lever 248, having pivotally connected thereto at 249 one end of a connecting-rod or pitman 250, the other end of which is pivotally connected to the large toothed wheel 241 at 251. 248ª is a washer placed on the lower end of shaft 275 below lever 248. At the end of arm 252 of the rocking lever (which arm is at the end whereto the connecting-rod 250 is pivoted) is pivoted a tubular socket-piece 253, into the socket of which is fitted the rear end of a long pawl 254, which is secured in said socket-piece by means of a set-screw 255. The point of the pawl engages a lug 256 at the side of the revolving casting 192. This pawl 254 is held against the sides of the revolving casting by flat springs 257, fixed at 258 to the rocking-lever. The end of the rocking lever opposite its arm 252 has pivoted thereto at 259 a pawl 260, much smaller than the other. This pawl 260 is caused to engage the sides of the revolving casting by means of a flat spring 261, fixed to the pivot 259. It also engages the lug 256. These pawls move above a supporting rail or guard 254ª. The object of these parts 254 and 260 is to revolve the gathering-frame during the operation hereinafter described, when the incoming stalks do not have any effect on said frame, but are supported on shelves or brackets to be referred to later on.

Referring to Fig. X, it will be seen that the vertical partition is represented in full lines at $a$ and in dotted lines at $b$ and $c$. As soon as the revolving frame and its partition, which together constitute a revolving shocking-frame, (which is caused to rotate by pressure caused by the packing in of the stalks,) arrive at the position indicated in full lines the binding mechanism is ready to be set in action, the revolving shocking-frame having been packed all around the semicircular formers with stalks, and to set the binding mechanism in action the following devices are provided in addition to those just described: The pivot 262 of the cog-wheel 239 has fixed loosely thereon below the latter a collar or box 263, through one side of which passes loosely a rod 264, having at its outer end a hook 265 and having at its rear end pivotal connection at 266 with a cam-faced lever 267, pivoted at 268 to the under side of the bracket 237 of the frame 108. The rod 264 is forced to its greatest outward movement by means of a flat spring 269, bearing behind the cam-faced end of the lever 267. A finger 270 of a trip 271, having a detent 272, engages behind the hook 265 of rod 264, said finger and detent being situated at one end of the trip, and the other end of the trip is pivoted to the needle-shaft 275 above the rocking lever 248, which is keyed thereon, and said needle-shaft extends up through the hollow column 152 and carries at its upper end the needle 276 of the binding mechanism. The needle-arm 277 has a feather-and-groove connection with the rock-shaft 275, similar to the connection of the knotter with shaft 242, as seen in Fig. IXª.

280 is a curved rod concentric with the pivot of the trip 271 (which pivot is the needle-shaft) and fixed to the bracket 237 above the rocking lever 248 and extending through a perforation in said trip. The outer end 281 of the rod 280 is screw-threaded, and fitting thereon is a nut 282, which regulates the pressure of the spiral spring 283, (coiled around the curved rod,) and it also limits the outward position of the trip. The spiral spring yields to the movement of the trip when it is pulled back by the hooked rod 264. The inward pull on the hooked rod 264 is accomplished by means of the cam-faced projection 284 coming in contact with the cam-face of lever 267 at the time when the partition reaches the position shown in full lines in Fig. X, and which projects down from the adjustable slide 285, fixed by means of a set-screw 286, passing through its slot 287, to the revolving frame or casting 192. The inward pull on the hooked rod 264 will, as stated, draw back the trip and its detent 272 out of line of rotation of the arm 229 of the trigger 228, and the gearing will be brought into action and the shaft 275 rocked first backward, which will cause the needle to pass across and above the entrance-opening 153, between the columns 151 and 152, and act, in connection with the knotter in the usual manner, to form the knot in the cord 288, and then forward to draw the needle back. As the needle is carried forward, the pawl 260 is carried forward into engagement with the lug 256 and causes the revolving casting to move a distance. Then as the needle moves back the long pawl 254 engages the lug and imparts to the casting a further movement until it arrives in the position shown in Fig. I. The trigger 228, not being tripped by detent 272, will permit one complete revolution of the wheel 241, thus giving the necessary movement to the knotter-shaft.

289 is a regulating set-screw passing through pendent projection 290 and bearing against the front side of the trip.

291 is the ball of cord, which may be carried on a reel 292.

The knot having been tied and the cam-faced projection 284 having passed out of engagement with lever 267, the cord is severed by a suitable device and the revolving frame continues its movement, the trip 271 being permitted to assume its normal position. When the vertical partition reaches the position shown in dotted lines at b, the mechanism which permits the leaves which support the bound shock in the revolving shocking-frame to drop is started. This mechanism is constructed as follows: 293 is a partial ring of the same curvature as the revolving casting or frame 192, and is fitted in a groove 293ᵃ, underneath the flange 193 thereof, in such a manner as to have a lateral movement therein. 294 and 295 are springs which are situated at each end of the partial ring 293, and which keep the latter in a certain position until their force is counteracted. The catches or supports 222 and 223 of the outer leaves 214 214 have outwardly-projecting hooks 296, the ends of which pass through perforations 297 in the sides of the revolving casting and into recesses 298, having inclined sides 299, said recesses being made in the upper side of the partial ring 293. Near the bottom of the vertical partition is an oscillating rod 300, having at its outer end a downward projection 301, this end of the rod passing through the side of the revolving casting and its hook extending down into a recess 302, formed in the top of the partial ring 293. The other end of this oscillating rod extends to the center of the shock-receiver, where it is provided with a T-head 303, having hooked ends 304 and 305. The hook 304 engages a recess 306 in one side of catch 218, which fits in recess 221 in one side of the partition. The hook 305 of the T-head 303 is connected with one end of a short link 307, the other end of which is pivoted to the upper end of shouldered catch 217. 308 is an oscillatory bolt fixed in the main frame 108, its upper end carrying an arm 309 and its lower end a dog 310. Bearing against the back of the arm 309 is a spring-pressure device 311, which tends to force both the arm 309 and the dog 310 inwardly. In the periphery of the partial or incomplete ring is a recess 312, and the periphery of the revolving frame is cut away at 313, the edge of which is curved inwardly. An anti-friction roller 314 on the end of arm 309, as one end of the cut-away 313 reaches it, rides against the inwardly-curved edge of the latter by reason of the spring device 311 pressing it inwardly, and the inward movement of the arm 309 and its roller 314 permits the dog 310 to engage the recess 312 in the periphery of the movable part ring, thus stopping the movement of the latter and distending and compressing the end springs 294 295, while the revolving frame continues to move. As soon as the roller 314 reaches the other end of the curved cut-away the dog will be disengaged from the recess 312 and the part ring permitted to move with the revolving frame, the end springs bringing it back to normal position. As the part ring is stopped by the dog 310, the hooks 296 of the outer catches are caused to be drawn from under the outer leaves by reason of the inclined sides 299 of the recesses 298 bearing against the hooks 296, and the inner catches 217 and 218 are caused to be drawn from under the inner leaves by reason of one end of the recess 302 engaging the projection 301 of the rod 300 and thus oscillating the latter. When the vertical partition arrives at the position c, (indicated in Fig. X,) the leaves will drop and the shock will be deposited on the ground. It will be observed that the top of the vertical partition is slanted or inclined. Now the shock is tied above the top of the partition, and it follows that as the machine is drawn forward the shock can slide down upon the incline, which acts to push the same out, as it were, and keeps it in upright position, and as the shock continues to move out it opens the gates at the rear and drops upon the ground in an upright position. The incline assists the rearward movement of the shock.

It will be seen that as the machine is being drawn forward and the shock passing out the leaves will be open, and unless there were provided some means for preventing it loose stalks would be carried through the entrance-opening of the shock-gathering frame and deposited onto the ground. To avoid this, I pivot at 315 in the recess 236, formed by the bracket 237 and its ends under the extended floor 109 of the frame 108, a horizontally-swinging shelf 317, having an outwardly-curved edge 318 and an inwardly-curved edge 319, the latter conforming substantially to the curve on the inner side of the frame 108. Pivoted at 320 to the frame 108 is a falciform arm 321, the curved end of which is connected by means of a pivot 322 with one end of a link 323, and the other end of said link is fixed to a pin 324, which extends loosely through the shelf and has fixed to its lower end an auxiliary shelf 326, which, when the vertical partition comes against the back of the falciform arm 321, is caused to move under the shelf 317, and both of these shelves together move into the recess 316. This movement is made before the leaves of the revolving frame open. As soon as the vertical partition passes the falciform arm (at about which time the leaves are opened) the shelves 317 and 326 spring back over the opening by reason of a flat spring 327 pressing against the falciform arm, and the incoming stalks are supported on these shelves until the leaves close again.

It may be desirable to elevate and lower the binding mechanism for different lengths of stalks, and to this end I provide the following mechanism: Arranged at the upper ends of the hollow columns 151 and 152 and within them and loosely fitting around the vertical shafts within the columns are vertically-movable tubular slides 327, only one being shown in Fig. IXᵃ; but both are alike, which are adapted to engage the knotter and needle-arm and hence elevate the latter. At the lower ends of these slides and projecting in front are perforated screw-threaded lugs 329 and 330, which extend through and work in elongated vertical slots 331 in the hollow columns. Working in these screw-threaded lugs are vertical rods 332 and 333, the former being situated on the right side of the entrance-opening of the shock-gathering frame and the latter on the left side, both of them passing through the extended floor of the main frame of the shock-gathering device and having bearing in journal-boxes 334, situated below said floor. Below these boxes both of these shafts are provided with bevel-wheels 335, between which is arranged a horizontal shaft 336, carrying at each end vertical bevel-wheels 337, each engaging with a wheel 335. Situated on vertical shaft 333 on the left of the entrance to the shock-gathering frame is a worm-wheel 338, which meshes with a worm-shaft 339, journaled in boxes 340 and 341, fixed, respectively, to the column 152 and to a bracket 342, extending up from the frame 108. At its outer end this worm-shaft 339 has detachable flexible connection 343 with a horizontal operating-shaft 344, extending toward the front end of the machine and ending near the driver's seat, where it is provided with a crank 345, whereby it may be turned. The crank end of the operating-shaft 344 is mounted in a journal-box 346.

Having thus described my invention, the following is what I claim as new therein and desire to secure by Letters Patent:

1. In a harvesting-machine, the combination of the gathering-points with passages between them, cutters in said passages, and an upwardly-inclined conveyer-chain between the passages moving in a vertical plane to raise inclined stalks to vertical position, substantially as and for the purpose set forth.

2. In a harvesting-machine, the combination of the gathering-points, upwardly-inclined chain on one of said points, and guide-rods on the sides of the same point, substantially as set forth.

3. In a harvesting-machine, the combination of the gathering-points with a passage between them for standing stalks, cutting mechanism in said passage, side cutters at one side of the machine for fallen stalks, and an inclined chute or its equivalent at the side of the passage and near the bottom of which the side cutters are mounted, substantially as and for the purpose set forth.

4. In a harvesting-machine, the combination of the gathering-points with a passage between them for the standing stalks, cutting mechanism therefor, vertical cutters at one side of the machine for fallen stalks, an inclined chute at the same side of the machine and at the side of the passage, and an endless chain adapted to run over the bottom of said chute, substantially as and for the purpose set forth.

5. In a harvesting-machine, the framing consisting of back beam 1, side beams 2 3, beam 8, contiguous to and parallel with beam 3, beam 10, contiguous to beam 2 and parallel therewith, parallel beams 12 and 13 between the beams 8 and 10, and cross-pieces connecting beams 2 and 10, beams 12 and 13, and beams 3 and 8, respectively, said beams 2 and 10, and likewise beams 12 and 13, meeting in points, substantially as set forth.

6. In a harvesting-machine, the combination, with the passages for the vertical stalks arranged between horizontal forwardly-projecting beams and cutters in said passages, of side cutters for fallen stalks, and an incline at the side of one of the passages and contiguous to the side cutters and having a side flange, substantially as and for the purpose set forth.

7. In a harvester, the combination, with the shock-gathering device, of the front part of the machine transversely hinged thereto and depressible and means for adjusting it sidewise on its hinge connection, substantially as set forth.

8. In a harvester, the combination of the rear and front portions of the machine, the latter having gathering-points, and hinge connection between the two portions, the front portion being laterally adjustable, so as to bring the width of the machine within smaller compass, as set forth.

9. In a harvesting-machine, the combination, with the main portion having recesses at its rear end, of the shock-gathering device having a hinge-rod fixed thereto and sliding in bearings in the main portion, wherewith it is movably connected with the rear end of the main portion of the machine, and a projection or hook at one end of said rod adapted to engage any one of said recesses, whereby the shock-gathering device may be shifted laterally, substantially as set forth.

10. In a harvester, the combination of the shock-gathering device and the frame of the same provided with a wheel and movable laterally with respect to the main portions, the main or front portion of the machine pivoted on the main-wheel axle and hinged to the shock-gathering device in the rear of said axle and in front of the wheel under the rear frame, a rod extending from the rear to the front having a projection at its rear end adapted to work in a slot in the frame of the shock-gathering device, and mechanism connected with the front end of said rod, whereby the front end of the machine may be depressed, substantially as set forth.

11. In a harvester, the combination of the shock-gathering device having a supporting-wheel, a rod extending forward from the gathering device and fixed from upward movement relative thereto, the main portion or front of the machine pivoted on the main-wheel axle and hinged to the rear part (the shock-gathering device) in the rear of said axle and in front of the wheel under the rear frame, stalk-gathering points at the front end of the machine with passages between them, cutters in said passages, and mechanism mounted on the main portion of the machine and connected with the front end of said rod, whereby the front end of the main portion of the machine may be depressed to cut the corn at variable distances from the ground, substantially as set forth.

12. In a harvester, the combination of the shock-gathering device and its frame, a supporting-wheel therefor, the main or front portion of the machine pivoted on the main-wheel axle, a hinge-rod connecting the two in the rear of said axle and in front of the wheel under the rear frame, a rod extending forward from the shock-gathering frame, a fixed medium on the latter above and independent of the forwardly-extending rod and intermediate the ends of the latter, and mechanism mounted on the main portion of the machine and connected with the front end of said rod, substantially as and for the purpose set forth.

13. In a harvester, the combination of the shock-gathering device and its frame, a supporting-wheel therefor, the main or front portion of the machine pivoted on the main-wheel axle and hinged to the shock-gathering frame in the rear of said axle and in front of the wheel of the rear frame, a rod extending forward from the shock-gathering frame and above the hinge-rod, a bridge-piece extending over the rod near its rear end, and mechanism mounted on the main portion of the machine and connected with the front end of said rod, substantially as and for the purpose set forth.

14. The combination, with the front and rear portions of a harvesting-machine hinged together, and said rear portion having a supporting-wheel in the rear of the main-wheel axle, said front portion being pivoted on said axle, of a rod extending forward from the rear portion and fixed from upward movement relative thereto, a segment-rack mounted on the front portion of the machine, a lever pivoted centrally with respect to the teeth of said rack and having a catch adapted to engage the teeth, an arm on said lever, and a link connecting said arm to the front end of the said rod, substantially as and for the purpose set forth.

15. The combination, with the front and rear portions of a harvester hinged together, and said rear portion having a supporting-wheel in the rear of the main-wheel axle, said front portion being pivoted on said axle, of a rod extending forward from the rear portion and fixed from upward movement relative thereto, an arm fixed to the front portion of the machine extending upwardly and outwardly, a guide-bar fixed at the top of same and passing through a hole near the end of said rod and secured at its lower end, said rod being curved on a line of which the hinge connection is the center, and lifting mechanism connected with said rod for depressing the front end of the machine, substantially as set forth.

16. The combination, with the front and rear portions of a harvester hinged together in the rear of the main-wheel axle, said front portion being pivoted on said axle and said rear portion having a supporting-wheel, of a rod extending forward from the rear portion and fixed from upward movement relative thereto, a segment-rack mounted on the front portion of the machine, a lever pivoted centrally with respect to the teeth of said rack and having a catch adapted to engage the teeth, an arm on said lever, a link connecting said arm to the front end of said rod, an arm fixed to the front portion of the machine extending upwardly and outwardly, a guide-bar fixed at top of same and passing through a hole near the end of said rod and secured at its lower end, said rod being curved on a line of which the hinge connection is the center, all substantially as and for the purpose set forth.

17. In a harvester, the combination of the front or main portion thereof and the shock-gathering frame hinged thereto and having a horizontally-extended floor with a straight front edge fitting against the main portion of the machine, over which floor the stalks pass butt down, substantially as set forth.

18. In a combined harvester and binder, packers having a series of teeth and divided into two parts and hinged, said packers forming between them an extended passage, substantially as set forth.

19. In a combined harvester and binder, packer-arms having crank connection at one end and link connection at the other end, said packer-arms being hinge-jointed intermediate of their ends, and springs to straighten out the packers, substantially as set forth.

20. In a combined harvester and binder, packer-arms 157, formed in two parts hinged together, a suitably-supported upright having collars or sleeves, movable rods connected to the packers and fitting in said sleeves, and springs surrounding said rods, substantially as set forth.

21. In a shock-gathering device, a revolving frame having a vertical partition, and packers for pushing the incoming stalks onto the frame, substantially as set forth.

22. In a shock-gathering device, the combination, with its frame open at the rear and having a circular track, of a revolving frame therein, also open at rear and moving on said track, substantially as set forth.

23. In a shock-gathering device, a revolving frame having a vertical partition provided with openings, and formers hinged thereto and adapted to fit in said openings, substantially as and for the purpose set forth.

24. In a shock-gathering device, a revolving frame having a vertical partition provided with openings, formers hinged at the edge of said openings, and springs for supporting the formers in horizontal position, substantially as and for the purpose set forth.

25. In a shock-gathering device, a revolving frame having a central vertical partition consisting of board 200, brackets 201, projecting from the board, and strips 202, fixed to the brackets, substantially as described.

26. In a shock-gathering device, a revolving frame having a vertical partition with upper and lower semicircular openings, semi-disks 205 and 206, adapted to fit within said openings and constituting formers, said disks being hinged at the edge of said openings, and springs for supporting said disks or formers horizontally, substantially as set forth.

27. In a shock-gathering device, the combination, with the frame 108, having a circular track, of the gate 184 186, having a track matching with the aforesaid track, a revolving frame adapted to move on said track, and packers for pushing the incoming stalks onto the revolving frame, substantially as set forth.

28. In a shock-gathering device, the combination, with its frame and the revolving frame within it, of a self-closing gate or gates at the rear, substantially as set forth.

29. In a shock-gathering device, a revolving frame having automatically-dropping leaves, and means for releasing said leaves as the frame makes a revolution, as set forth.

30. In a shock-gathering device, a revolving frame having a vertical partition, hinged leaves at each side of the partition, and automatic mechanism acting to release said leaves at the completion of each revolution of the frame, as set forth.

31. The combination, in a shock-gathering device, of a revolving frame having automatically-dropping leaves on which the stalks are supported in upright position, and springs for bringing the leaves back to normal position, substantially as set forth.

32. In a shock-gathering device, the combination, with the revolving frame open at one side and having hinged leaves, forming a platform on which the stalks are supported in upright position, and having suitable releasing mechanism, of catches for supporting them, as set forth.

33. In a shock-gathering device, the combination, with the hinged leaves having catches for supporting them and constituting a circular revolving platform for supporting the stalks in upright position, of springs for bringing them back from their fallen position to a position above the catches, substantially as set forth.

34. In a shock-gathering device, the combination, with a revolving frame having the automatically-dropping leaves hinged in pairs and having springs for returning them to normal position, of spring-catches for supporting them in said position, as set forth.

35. The combination, in a shock-gathering device, of a revolving frame having hinged leaves, catches for supporting the leaves, a piece independently movable of and carried by said frame and engaging with said catches for releasing them, and mechanism for moving said piece, as set forth.

36. The combination, in a shock-gathering device, of a revolving frame having hinged leaves, catches for supporting the latter, releasing mechanism carried by said frame, and a spring-dog on a fixed portion of the machine for operating the releasing mechanism, substantially as set forth.

37. The combination, in a shock-gathering device, of a revolving frame having hinged leaves, catches, an independently-movable ring carried by the frame, means for operating the ring, and mechanism for operating said catches engaging said ring, substantially as set forth.

38. The combination, in a shock-gathering device, of a revolving frame having hinged leaves, catches supporting the latter, a ring movably fixed in a groove in said frame, means for holding said ring-releasing mechanism engaging said ring and connected with said catches, and means for engaging and moving said ring fixed on a stationary part of the machine, substantially as set forth.

39. The combination, in a shock-gathering device, of a revolving frame having hinged leaves, catches, a movable ring carried by the frame, having recesses therein, a dog for engaging one of said recesses mounted on a stationary portion of the device, and releasing mechanism engaging said ring and connected with said catches, substantially as set forth.

40. The combination, in a shock-gathering device, of a revolving frame having hinged leaves, catches, a movable ring having recesses therein, means for holding said ring, and releasing devices having hooks engaging said recesses and connected with the catches, substantially as set forth.

41. The combination, in a shock-gathering device, of a revolving frame having hinged leaves, catches, a movable ring carried by the frame, having recesses in its top and one in its side, means independent of the frame for holding said ring by engagement with the side recess, and releasing devices having hooks engaging the top recesses and connected with the catches, substantially as set forth.

42. The combination, in a shock-gathering device and its frame, of a revolving frame having hinged leaves, an oscillatory bolt or pin mounted in said shock-gathering frame, an arm carried by its upper end and a dog carried by its lower end, a spring engaging said arm, a movable ring carried by the revolving frame, catches for supporting said leaves, and releasing mechanism having engagement with said ring and connected with said catches, said dog being adapted to engage a recess in said ring and said arm being adapted to engage a recess or cut-away in the revolving frame, substantially as set forth.

43. The combination, in a shock-gathering device and its frame, of a revolving frame having hinged leaves, a spring-dog mounted in said shock-gathering frame, a movable ring carried by the revolving frame and provided with recesses, catches supporting said leaves, releasing devices connected with said catches and having engagement with all but one of said recesses, with which said dog has engagement, and an arm connected with said dog and engaging a recess or cut-away portion in the revolving frame, substantially as and for the purpose set forth.

44. The combination, in a shock-gathering device, of a revolving frame having hinged leaves, a movable ring carried by the latter frame, tension and compression springs, respectively, at each end of said ring, catches for supporting the leaves, releasing devices connected with said catches and engaging said ring, and a tripping device supported by a stationary part of the machine and engaging the ring, substantially as set forth.

45. The combination, in a shock-gathering device, of a revolving frame having two sets of leaves with releasing devices, the releasing device for the inner leaves consisting of an oscillatory rod having a T-head provided with hooked ends, catches engaged by said hooked ends, and means for operating said releasing devices, substantially as set forth.

46. The combination, in a shock-gathering device, of a revolving frame having two sets of leaves with releasing devices, the releasing device for the outer leaves consisting of catches having hooks projecting through said frame, a movable piece carried by the frame and engaged by said hooks, and means for operating said piece, substantially as set forth.

47. The combination, in a binding mechanism, of operating-shafts arranged one on each side of a passage, a knotter and a needle mounted one on each shaft, and means for adjusting the knotter and needle along said shafts, consisting of rotatable rods arranged alongside of said shafts and extending below the floor of said passage, elevating devices connected with and operated by said rods for acting upon the knotter and needle, a shaft geared with said rods for rotating them simultaneously, and means for rotating the latter shaft, substantially as set forth.

48. The combination, with the shock-gathering device having binding mechanism, of the operating-shafts on which the needle and knotter are mounted, hollow columns in which said shafts move, movable sleeves adapted to elevate said knotter and needle and having screw-threaded perforated lugs passing through slots in said columns, and screw-operating rods engaging said lugs, substantially as set forth.

49. The combination, with the shock-gathering device having binding mechanism, of the operating-shafts on which the needle and knotter are mounted, hollow columns in which said shafts move, movable sleeves within said columns adapted to elevate said needle and knotter, and lugs on said sleeves projecting through slots in said columns, substantially as set forth.

50. The combination, with the shock-gathering device having binding mechanism, of means for elevating the needle and knotter of said mechanism, having a worm-shaft and vertical operating-rods, one for the knotter and one for the needle, a horizontal shaft, and gearing whereby they are suitably connected, and one of which is provided with a worm-wheel with which said worm-shaft engages, substantially as set forth.

51. The combination, with the shock-gathering device having binding mechanism, of means for elevating the needle and knotter of said mechanism, having vertical operating-rods suitably connected, a shaft having suitable connection with one of said rods, and a horizontal operating-rod having a crank at one end and detachable connection with said shaft at the other end, substantially as set forth.

52. The combination, with the revolving frame having a projection on its under side, of tripping mechanism having a finger, a movable hooked rod engaging said finger, a cam-lever connected to said rod and adapted to be engaged by said projection to draw the finger toward it, and the main operating-shaft having a trigger mechanism adapted to be engaged by the finger of said tripping mechanism, substantially as set forth.

53. In combination with the binding mechanism, mechanism for automatically operating the same, the intermittently-revoluble shock-gathering frame having a projection and adapted to be rotated by the incoming material, a rocking lever connected with said automatic mechanism, and pawls operated from said lever for moving the revolving frame by engagement with said projection through a portion of its revolution, substantially as and for the purpose set forth.

54. The combination, with a shock-forming device consisting, essentially, of an outer frame and an inner revolving table, and means for feeding the incoming stalks to cause said table to revolve independently of the other operating mechanism, of a binding mechanism for securing the shock in said shock-forming device, and means connected with said revolving table to automatically set into operation the binding mechanism to bind said shock when the table is revolved sufficiently to form a shock, substantially as specified.

EZRA EDGAR WITTER.

Witnesses:
R. C. HORR,
JAMES SWISHER.